United States Patent
Ando et al.

(10) Patent No.: US 11,673,385 B2
(45) Date of Patent: Jun. 13, 2023

(54) METHOD FOR MACHINING SYNTHETIC QUARTZ GLASS SUBSTRATE

(71) Applicant: Shin-Etsu Chemical Co., Ltd., Tokyo (JP)

(72) Inventors: Masao Ando, Joetsu (JP); Hiroyuki Yamazaki, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/494,262

(22) Filed: Oct. 5, 2021

(65) Prior Publication Data
US 2022/0126558 A1 Apr. 28, 2022

(30) Foreign Application Priority Data
Oct. 27, 2020 (JP) .............................. JP2020-179551

(51) Int. Cl.
| | |
|---|---|
| B32B 38/00 | (2006.01) |
| B32B 37/12 | (2006.01) |
| B32B 17/10 | (2006.01) |
| B32B 3/26 | (2006.01) |
| B32B 7/12 | (2006.01) |

(52) U.S. Cl.
CPC .......... *B32B 38/0004* (2013.01); *B32B 37/12* (2013.01); *B32B 3/266* (2013.01); *B32B 7/12* (2013.01); *B32B 17/10005* (2021.01); *B32B 2307/538* (2013.01)

(58) Field of Classification Search
CPC ..... B32B 38/0004; B32B 37/12; B32B 3/266; B32B 7/12; B32B 17/10005; B32B 2307/538
See application file for complete search history.

(56) References Cited

U.S. PATENT DOCUMENTS

| | | | |
|---|---|---|---|
| 2015/0110991 A1* | 4/2015 | Miwa ................ | B32B 17/10706 428/77 |
| 2017/0326688 A1* | 11/2017 | Turner ................ | B23K 26/382 |

FOREIGN PATENT DOCUMENTS

| | | |
|---|---|---|
| JP | 61-288940 A | 12/1986 |
| JP | 2011-111370 A | 6/2011 |
| JP | 2016-180798 A | 10/2016 |

OTHER PUBLICATIONS

Extended European Search Report for European Application No. 21199925.5, dated Mar. 9, 2022.

* cited by examiner

*Primary Examiner* — Cynthia L Schaller
(74) *Attorney, Agent, or Firm* — Birch, Stewart, Kolasch & Birch, LLP (57) ABSTRACT

A synthetic quartz glass substrate is machined by bringing a surface of the synthetic quartz glass substrate as the workpiece into contact with and superposing it on a surface of a protective member made of synthetic quartz glass to effect optical contact bonding of the workpiece and the protective member, and passing a cutting tool through the optical contact bonding surfaces. This machining process is able to effectively prevent the generation of microdefects at the cutting tool entry site and extraction site during a cutting operation. Moreover, a fixing agent is not used to join the workpiece and the protective member, and so productivity is high because there is no need for the application and later removal of a fixing agent.

12 Claims, 5 Drawing Sheets

METHOD FOR MACHINING SYNTHETIC QUARTZ GLASS SUBSTRATE

CROSS-REFERENCE TO RELATED APPLICATION

This non-provisional application claims priority under 35 U.S.C. § 119(a) on Patent Application No. 2020-179551 filed in Japan on Oct. 27, 2020, the entire contents of which are hereby incorporated by reference.

TECHNICAL FIELD

The present invention relates to a method for machining a synthetic quartz glass substrate.

BACKGROUND ART

Synthetic quartz glass substrates employed in such applications as microfluidics, microlens arrays, semiconductor substrates and optical elements are furnished for use after the formation of features such as through-holes, blind holes, channels and steps therein by machining. Such machining is generally carried out using a tool such as a grinding wheel or a drill. During machining, microdefects such as chipping, burrs and fractures arise at openings in the workpiece such as the tool entry site and tool extraction site. These microdefects are a cause of problems in various applications. For example, in microfluidics, problems such as flow channel obstruction, reduced analytical precision and foreign material contamination may arise. In semiconductor substrates, stress concentration arises at microdefect areas during manufacturing processes, which sometimes leads to problems such as substrate failure.

In cases where, for example, a through-hole is to be formed in a substrate, such problems are generally addressed by, in order to prevent microdefect generation at the tool entry site, machining the substrate together with a cover plate that has been placed against the side of the substrate to be worked. For example, JP-A S61-288940 teaches the method of laminating an aluminum alloy cover plate with adhesive to a workpiece and machining the workpiece together with the cover plate.

JP-A 2011-111370 describes a glass plate manufacturing method which uses a drilling process that creates a through-hole in a glass plate by advancing a first drill from one side of the glass plate in the thickness direction while cutting to form a blind hole, subsequently retracting the initial drill and then advancing, along the same axis as the first drill, a second drill from the other side of the glass plate while cutting. In the drilling process, at least one of the drills has a body of constant diameter in the axial direction, a small-diameter portion positioned on the drill base side of the body and of smaller diameter than the body, and a connecting portion that connects the body and the small-diameter portion. Also, one of the drills is provided with cutting ability in a region extending from the drill tip to at least the body side of the connecting portion. When one drill has advanced to its greatest depth, the connecting portion reaches the inner side of the glass plate in the thickness direction. Chipping of the opening is reportedly prevented by this method.

However, in the method described in JP-A S61-288940 which places a cover plate against the workpiece at the tool entry site, because an adhesive is used to secure the cover plate, the gap between the workpiece and the cover plate that forms due to the adhesive layer causes microdefects to arise. Such defects are difficult to prevent. In addition, it is impossible to completely prevent microdefects from arising at the tool extraction site. Also, a method that uses a fixing agent such as an adhesive or a coagulant to secure the cover plate and the substrate requires also a fixing agent applying step and a fixing agent removing step, which is disadvantageous in terms of productivity.

As for the through-hole forming method disclosed in JP-A 2011-111370, this requires both production equipment that is capable of advancing the first drill and the second drill on the same axis and also specially shaped drills. In addition, preventing the formation of even smaller microdefects is difficult.

SUMMARY OF THE INVENTION

It is therefore an object of the present invention to provide a method for machining a synthetic quartz glass substrate which minimizes defect formation and has an excellent productivity.

As a result of extensive investigations, we have discovered that when machining synthetic quartz glass substrates, by optical contact bonding synthetic quartz glass surfaces to each other and then cutting, microdefect formation at the cutting tool entry site and extraction site during machining can be suppressed at the bonding surfaces. Moreover, because a fixing agent is not used in optical contact bonding, the synthetic quartz glass surfaces can be separated without additional steps after machining. Machining that both minimizes defects and has a good productivity can thus be carried out.

Accordingly, one aspect of the invention is directed at a method for machining a synthetic quartz glass substrate, which method includes the steps of furnishing a synthetic quartz glass substrate as a workpiece; furnishing a member for protecting the workpiece, which protective member is made of synthetic quartz glass; optical contact bonding the workpiece and the protective member by bringing a surface of the protective member into contact with and superposing it on a surface of the workpiece; and cutting the synthetic quartz glass substrate by passing a cutting tool from the protective member side and through the optical contact bonding surface to the synthetic quartz glass substrate side and/or from the synthetic quartz glass substrate side and through the optical contact bonding surface to the protective member side.

In the first aspect of the invention, the optical contact bonding surface of the synthetic quartz glass substrate with the protective member and the optical contact bonding surface of the protective member with the synthetic quartz glass substrate each have an arithmetic mean roughness (Ra) of 1 nm or less.

A second aspect of the invention is directed at a method for machining synthetic quartz glass substrates, which method includes the steps of furnishing a plurality of synthetic quartz glass substrates; optical contact bonding the plurality of synthetic quartz glass substrates by mutually contacting and superposing surfaces of the respective synthetic quartz glass substrates to give a workpiece; furnishing at least two members for protecting the workpiece, which protective member is made of synthetic quartz glass; optical contact bonding the workpiece and the protective member by bringing a surface of the protective member into contact with and superposing it on a surface of the workpiece; and cutting the synthetic quartz glass substrates by passing a cutting tool from one protective member side and through the optical contact bonding surface thereof to the workpiece side at the synthetic quartz glass substrate spaced furthest from the one protective member and from the synthetic quartz glass substrate spaced furthest from the one protective member and through the optical contact bonding surface thereof to the other protective member side.

In the second aspect of the invention, the optical contact bonding surfaces between the synthetic quartz glass substrates in the workpiece, the optical contact bonding surface of the workpiece with the protective member, and the optical contact bonding surface of the protective member with the workpiece each have an arithmetic mean roughness (Ra) of 1 nm or less.

Advantageous Effects of the Invention

This invention is able to effectively prevent the generation of microdefects at the cutting tool entry site and extraction site during a cutting operation. Moreover, a fixing agent is not used to bond together the workpiece and the protective member, and so productivity is high because there is no need for the application and later removal of a fixing agent.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

As noted above, a first aspect of the inventive method for machining a synthetic quartz glass substrate includes the steps of furnishing a synthetic quartz glass substrate as a workpiece; furnishing a protective member made of synthetic quartz glass; optical contact bonding the workpiece and the protective member by bringing a surface of the protective member into contact with and superposing it on a surface of the workpiece, typically, to form an assembly in which the workpiece and the protective member are joined at an optical contact bonding surface and which has a protective member side and a synthetic quartz glass substrate (workpiece) side; and cutting the synthetic quartz glass substrate by passing a cutting tool from the protective member side and through the optical contact bonding surface to the synthetic quartz glass substrate side and/or from the synthetic quartz glass substrate side and through the optical contact bonding surface to the protective member side.

A second aspect of the invention method for machining a synthetic quartz glass substrate includes the steps of furnishing a plurality of synthetic quartz glass substrates; optical contact bonding the plurality of synthetic quartz glass substrates by mutually contacting and superposing surfaces of the respective synthetic quartz glass substrates to give a workpiece; furnishing a protective member made of synthetic quartz glass; optical contact bonding the workpiece and the protective member by bringing a surface of the protective member into contact with and superposing it on a surface of the workpiece, typically, to form an assembly in which the synthetic quartz glass substrates and the protective members are joined at respective optical contact bonding surfaces and which has one protective member side and the other protective member side; and cutting the synthetic quartz glass substrates by passing a cutting tool from one protective member side and through the optical contact bonding surface thereof to the workpiece side at the synthetic quartz glass substrate spaced furthest from the one protective member and from the synthetic quartz glass substrate spaced furthest from the one protective member and through the optical contact bonding surface thereof to the other protective member side.

The synthetic quartz glass substrate used in this invention may be one obtained by molding to the desired shape a synthetic quartz glass ingot produced by the oxyhydrogen flame reaction of a silica starting compound such as a silane compound or a siloxane compound, annealing the ingot and then slicing it to the desired thickness, followed by lapping and, if necessary, edge grinding, and subsequently coarse polishing and fine polishing. The synthetic quartz glass substrate may be one produced by a known method and is not particularly limited.

The synthetic quartz glass substrate may be of any suitable shape, such as a square shape or a circular shape. For example, among square glass substrates, preferred use can be made of ones having a size of from 10×10 mm to 300×300 mm. Among circular glass substrates, preferred use can be made of ones having a diameter of from 10 to 300 mm. The thickness of the synthetic quartz glass substrate may be suitably selected, but is preferably at least 0.01 mm, more preferably at least 0.05 mm, and even more preferably at least 0.1 mm, and is preferably 300 mm or less, more preferably 100 mm or less, and more preferably 30 mm or less.

One or both surfaces of the synthetic quartz glass substrate (the surfaces to be optical contact bonded) should have a degree of flatness that makes optical contact possible, the arithmetic mean roughness (Ra) thereof being preferably 1 nm or less, more preferably 0.5 nm or less, and even more preferably 0.3 nm or less. At an arithmetic mean roughness (Ra) within this range, close adherence of the optical contact bonding surfaces can be maintained, making it possible to avoid problems such as an inability to stack and secure the substrate by optical contact or an inadequate bonding force that allows delamination to occur during machining. In the practice of this invention, the arithmetic mean roughness (Ra) can be measured with an atomic force microscope (AFM).

A single synthetic quartz glass substrate may be furnished as the workpiece or a plurality (two or more) of synthetic quartz glass substrates may be furnished and used together as the workpiece. In cases where a plurality of synthetic quartz glass substrates are used as the workpiece, it is effective to form the workpiece by stacking the plurality of synthetic quartz glass substrates with their surfaces in mutual contact and optical contact bonding of the respective synthetic quartz glass substrates. By adopting this arrangement, a plurality of synthetic quartz glass substrates can be machined at one time, enabling even better machining productivity to be achieved. Given the adverse effect on optical contacting associated of the increased warpage by synthetic quartz glass substrates when a large number of synthetic quartz glass substrates are stacked together, the number of stacked synthetic quartz glass substrates is preferably not more than 50, and more preferably not more than 20.

A plurality of synthetic quartz glass substrates are optical contact bonded by having the surfaces of the synthetic quartz glass substrates brought close together. In this way, the synthetic quartz glass substrates are stacked and fixed to one another. As used herein, "optical contacting" refers to the technique of bonding together smooth glass surfaces simply by pressing them against each other and bringing them close together. Such bonding depends on van der Waals forces between the glass surfaces or on hydrogen bonds between surface silanol groups that form due to the adsorption of water.

Before bringing the surfaces of the synthetic quartz glass substrates closely together by optical contacting, it is preferable to wash the synthetic quartz glass substrates. Washing may be carried out by any method capable of removing particles having a size of 100 μm or more. Examples include methods that use pure water, an alcohol-based solution, an acidic solution such as of sulfuric acid, an alkaline solution such as ammonia water or a surfactant. Washing may be carried out by a single method or by a plurality of methods used in combination. Ultrasonic washing may also be used together with these methods.

The protective member made of synthetic quartz glass that is used in this invention may be one obtained by molding to the desired shape a synthetic quartz glass ingot produced by the oxyhydrogen flame reaction of a silica starting compound such as a silane compound or a siloxane compound, annealing the ingot and cutting it to the desired size (such as slicing it to the desired thickness), followed by lapping and, if necessary, edge grinding, and subsequently coarse polishing and fine polishing. The protective member made of synthetic quartz glass may be one produced by a known method, and is not particularly limited.

The protective member made of synthetic quartz glass is an auxiliary member used when machining synthetic quartz glass substrate, and may be of any suitable shape such as a square or circular shape. For example, among protective members having a square shape, preferred use can be made of ones having a size of from 10×10 mm to 300×300 mm. Among circular protective members, preferred use can be made of ones having a diameter of from 10 to 300 mm. The thickness of the protective member made of synthetic quartz glass is suitably selected. However, given that the time it takes to cut the protective member during machining affects the productivity and to make it easy to separate the protective member from the synthetic quartz glass substrate afterwards, the thickness is preferably at least 0.01 mm, more preferably at least 0.1 mm, and even more preferably at least 0.2 mm, and is preferably not more than 300 mm, more preferably not more than 100 mm, and even more preferably not more than 10 mm. The protective member made of synthetic quartz glass is preferably in the form of a plate (sometimes referred to as a "cover plate").

At least one surface of the protective member made of synthetic quartz glass (the optical contact bonding surface) should have a degree of flatness that enables optical contact, the arithmetic mean roughness (Ra) thereof being preferably 1 nm or less, more preferably 0.5 nm or less, and even more preferably 0.3 nm or less. At an arithmetic mean roughness (Ra) within this range, close adherence of the optical contact bonding surfaces can be maintained, making it possible to avoid problems such as an inability to stack and secure the substrate by optical contact or an inadequate bonding force that allows delamination to occur during machining.

The number of protective members made of synthetic quartz glass that are furnished is typically one or two. For example, in cases where a blind hole is to be formed in a synthetic quartz glass substrate, machining is possible using a single protective member. In cases where a through-hole is to be formed in a synthetic quartz glass substrate, machining is possible using a single protective member, although it is preferable to use two protective members when machining. Where necessary, three or more protective members made of synthetic quartz glass may be used.

The workpiece (synthetic quartz glass substrate) and the protective member made of synthetic quartz glass are optical contact bonded by bringing a surface of the synthetic quartz glass substrate close together with a surface of the protective member made of synthetic quartz glass. In this way, the protective member made of synthetic quartz glass is superposed on the workpiece, thereby fixing the workpiece and the protective member made of synthetic quartz glass to each other.

Before bringing the synthetic quartz glass substrate (workpiece) and the protective member made of synthetic quartz glass close together by optical contacting, it is preferable to wash each synthetic quartz glass substrate and protective member made of synthetic quartz glass. Washing may be carried out by any method capable of removing particles having a size of 100 μm or more. Examples include methods that use pure water, an alcohol-based solution, an acidic solution such as of sulfuric acid, an alkaline solution such as ammonia water or a surfactant. Washing may be carried out by a single method or by a plurality of methods used in combination. Ultrasonic washing may also be used together with these methods.

In this invention, features such as holes, slits, channels and steps are formed in the synthetic quartz glass substrate according to the intended application, such as microfluidics, microlens arrays, semiconductor substrates and optical members.

In the practice of the invention, when a single synthetic quartz glass substrate is machined as the workpiece, such machining may include either or both of the following operations:

(a) the operation of cutting the synthetic quartz glass substrate by passing the cutting tool from the protective member side and through the optical contact bonding surface to the synthetic quartz glass substrate side, and (b) the operation of cutting the synthetic glass substrate by passing the cutting tool from the synthetic quartz glass substrate side and through the optical contact bonding surface to the protective member side.

Specifically, when forming a blind hole, channel, step or the like, machining should be carried out so as to include operation (a). When forming a through-hole, slit or the like, machining should be carried out so as to include both operations (a) and (b). In cases where a through-hole, slit or the like is to be formed and it is acceptable for only the opening on one side to be low-defect, machining may be carried out by including operation (b) and not including operation (a).

When a plurality of synthetic quartz glass substrates are machined as the workpiece, the synthetic quartz glass substrate can be machined by furnishing a plurality of (typically two) protective members made of synthetic quartz glass, optical contact bonding one protective member to one surface of the workpiece and another protective member to the other surface of the workpiece, and including (c) the operation of cutting the synthetic quartz glass substrates by passing the cutting tool from the side of one protective member and through the optical contact bonding surface thereof to the workpiece side at the synthetic quartz glass substrate spaced furthest from the protective member, and also (d) the operation of cutting the synthetic quartz glass substrate by passing the cutting tool from the synthetic quartz glass substrate spaced furthest from one protective member and through the optical contact bonding surface thereof to the side of the other protective member.

This approach is preferred in cases where through-holes, slits and the like are to be formed at the same time in a plurality of synthetic quartz glass substrates.

Machining can be carried out using a machining center or other numerical control machine tool. Specifically, machining is carried out using a grinding tool composed of diamond abrasive, cubic boron nitride abrasive or the like fixed by electrodeposition, metal bonding or the like to the main spindle of a machining center or other numerical controlled machine tool programmed to create the desired shape. The grinding tool abrasive is not particularly limited as to the grain size. However, for the sake of machining accuracy and productivity, the grain size is preferably at least #20, and especially #100 or more, but is preferably not more than #5000, and especially not more than #2000. The rotational speed of the grinding tool spindle also is not particularly limited; for the sake of machining accuracy and productivity, it is preferably at least 100 rpm, and especially at least 1,000 rpm, but preferably not more than 70,000 rpm, and especially not more than 60,000 rpm. The cutting feed rate also is not particularly limited; for the sake of machining accuracy and productivity, it is preferably at least 1 mm/min, and especially at least 10 mm/min, but preferably not more than 10,000 mm/min, and especially not more than 1,000 mm/min. Also, for cooling, debris removal and the like, it is preferable to use an emulsion-based, water-soluble, oil-based or other type of cutting fluid while cutting.

By using the synthetic quartz glass substrate machining method of the present invention to form, in accordance with the intended application such as microfluidics, microlens arrays, semiconductor substrates and optical members, features such as holes, slits, channels and steps on a synthetic quartz glass substrate, the generation of microdefects at cutting tool entry sites and extraction sites during machining can be effectively prevented.

EXAMPLES

The following Examples and Comparative Examples are provided to illustrate the invention, but are not intended to limit the scope thereof.

Example 1

A synthetic quartz glass substrate having a diameter of 150 mm, a thickness of 0.5 mm and an arithmetic mean roughness (Ra) of 0.3 nm on both polished sides was furnished by lapping a sliced disk of synthetic quartz glass (diameter, 150 mm) with a double-sided lapping machine that carries out planetary motion, subsequently coarse polishing using a hard urethane polishing cloth and cerium oxide polish with a double-sided polishing machine that carries out planetary motion and, in turn, fine polishing using a suede polishing cloth and colloidal silica polish with a double-sided polishing machine that carries out planetary motion.

A single protective member (cover plate) having a diameter of 150 mm, a thickness of 0.5 mm and an arithmetic mean roughness (Ra) of 0.3 nm on both polished sides was furnished in the same way as the synthetic quartz glass substrate.

Next, the synthetic quartz glass substrate and the protective member made of synthetic quartz glass were washed with an aqueous solution of potassium hydroxide, hot concentrated sulfuric acid, a weakly alkaline surfactant and pure water, and then IPA dried.

A polished side of the synthetic quartz glass substrate and a polished side of the protective member made of synthetic quartz glass were then contacted, stacked and brought close together to effect optical contact bonding.

Next, by cutting with a machining center, a hole was formed from the protective member side and through the optical contact bonding surface so as to reach the synthetic quartz glass substrate, thus creating a blind hole having a diameter of 0.5 mm and a depth of 0.3 mm in the synthetic quartz glass substrate. The cutting process was a helical process carried out under the following machining conditions using a water-soluble cutting fluid.

Machining Conditions

Figure 1:
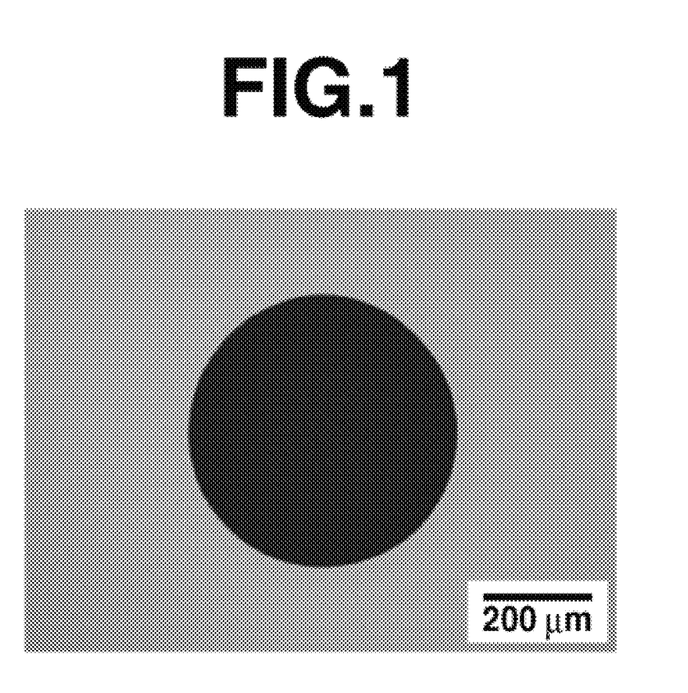
FIG. 1 is a laser micrograph of the cutting tool entry site at the blind hole formed in the synthetic quartz glass substrate in Example 1.

Cutting tool: electrodeposited diamond grinding wheel (AAR07, from FSK K.K.)
Abrasive grain size: #600
Main spindle speed: 20,000 rpm
Cutting delivery speed: 40 mm/min
Helical lead: 0.002 mm FIG. 1 shows a laser micrograph of the cutting tool entry site for the blind hole formed in the synthetic quartz glass substrate. Microdefects were not observed at the cutting tool entry site of the blind hole formed in the synthetic quartz glass substrate.

Example 2

One synthetic quartz glass substrate and two protective members (cover plates) made of synthetic quartz glass were furnished in the same way as in Example 1.

The synthetic quartz glass substrate and the protective members made of synthetic quartz glass were then washed and dried in the same way as in Example 1.

Next, one polished side of the synthetic quartz glass substrate was contacted with a polished side of the first protective member made of synthetic quartz glass, the other polished side of the synthetic quartz glass substrate was contacted with a polished side of the second protective member made of synthetic quartz glass, and these were stacked and brought close together to effect optical contact bonding.

Using a machining center similar to that in Example 1 to cut under the same machining conditions as in Example 1, a hole was formed from the side of one protective substrate and through two optical contact bonding surfaces so as to reach the other protective member, thus creating a through-hole having a diameter of 0.5 mm in the synthetic quartz glass substrate.

Figure 2A:
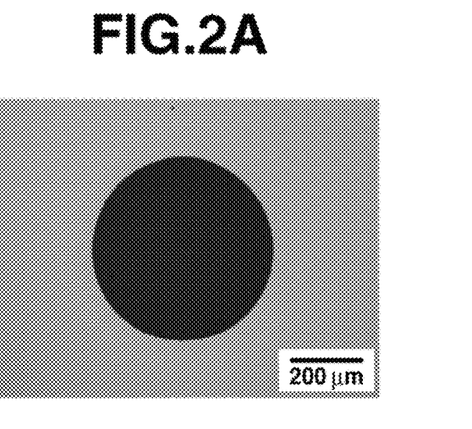
FIG. 2A and FIG. 2B present laser micrographs of the through-hole formed in the synthetic quartz glass substrate in Example 2, FIG. 2A showing the cutting tool entry site and FIG. 2B showing the cutting tool extraction site.
Figure 2B:
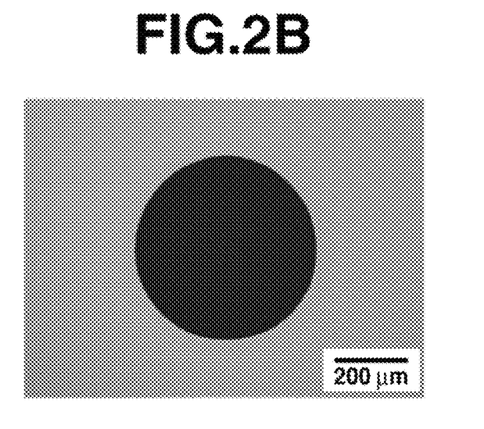
Figure 3A:
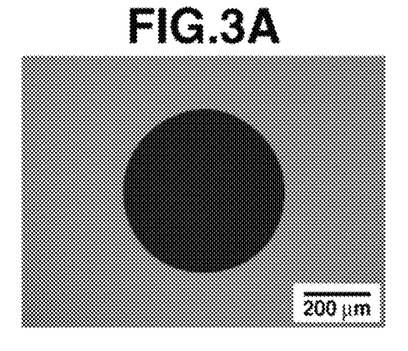
FIG. 3A-FIG. 3H present laser micrographs of the through-holes formed in the synthetic quartz glass substrates in Example 3, FIGS. 3A, 3C, 3E and 3G each showing cutting tool entry sites in the first to fourth substrates and FIGS. 3B, 3D, 3F and 3H each showing cutting tool extraction sites in the first to fourth substrates.
Figure 3B:
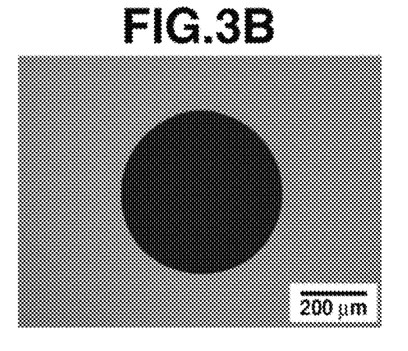
Figure 3C:
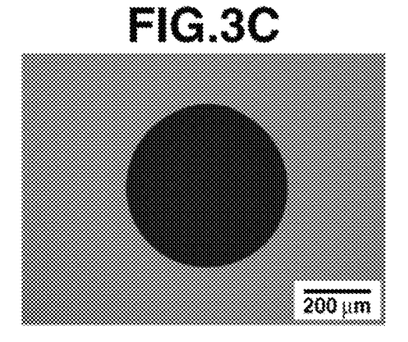
Figure 3D:
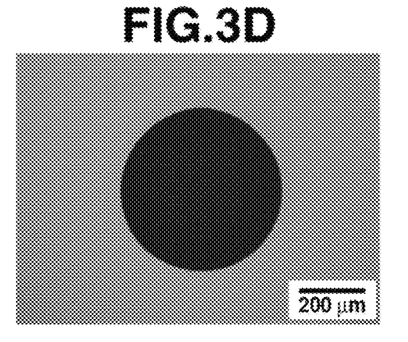
Figure 3E:
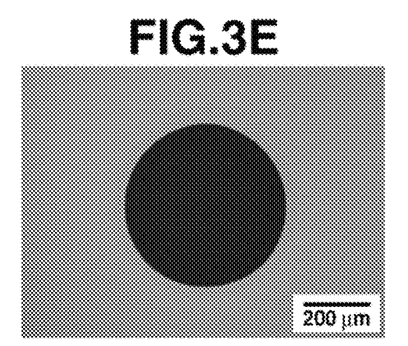
Figure 3F:
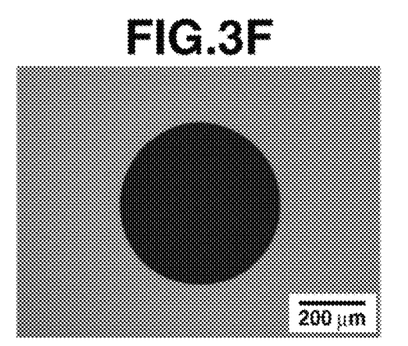
Figure 3G:
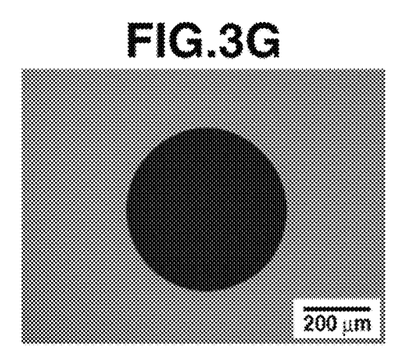
Figure 3H:
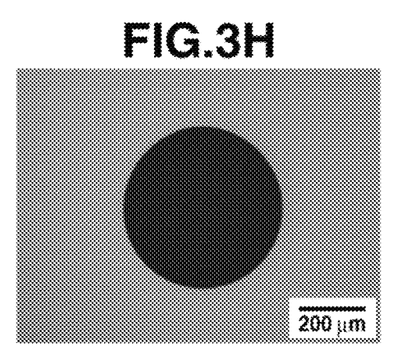

Here, FIG. 2 presents laser micrographs of the through-hole formed in the synthetic quartz glass substrate. FIG. 2A shows the cutting tool entry site and FIG. 2B shows the cutting tool extraction site. Microdefects were not observed at the cutting tool entry site or extraction site of the through-hole formed in the synthetic quartz glass substrate.

Example 3

Four synthetic quartz glass substrates and two protective members (cover plates) made of synthetic quartz glass were furnished in the same way as in Example 1.

The synthetic quartz glass substrates and the protective members made of synthetic quartz glass were washed and dried in the same way as in Example 1.

Next, the polished sides of the four synthetic quartz glass substrates were mutually contacted, stacked and brought close together to effect optical contact bonding. Three optical contact bonding surfaces are thereby formed in this case.

Next, one of the remaining polished surfaces of the synthetic quartz glass substrates is brought into contact with the polished surface of the first protective member made of synthetic silica glass, and the other remaining polished surface of the synthetic quartz glass substrates is contacted with the polished surface of the second protective member made of synthetic quartz glass, stacked and brought close together to effect optical contact bonding.

Using a machining center similar to that in Example 1 to cut under the same machining conditions as in Example 1, a hole was formed from the side of one protective substrate and through five optical contact bonding surfaces so as to reach the other protective member, thus creating a through-hole having a diameter of 0.5 mm in each of the four synthetic quartz glass substrates.

FIG. 3 presents laser micrographs of the through-holes formed in the synthetic quartz glass substrates. FIG. 3A shows the cutting tool entry site in the first synthetic quartz glass substrate from the tool entry side, and FIG. 3B shows the cutting tool extraction side in the first synthetic quartz glass substrate from the tool entry side. FIG. 3C shows the cutting tool entry site in the second synthetic quartz glass substrate from the tool entry side, and FIG. 3D shows the cutting tool extraction side in the second synthetic quartz glass substrate from the tool entry side. FIG. 3E shows the cutting tool entry site in the third synthetic quartz glass substrate from the tool entry side, and FIG. 3F shows the cutting tool extraction side in the third synthetic quartz glass substrate from the tool entry side. FIG. 3G shows the cutting tool entry site in the fourth synthetic quartz glass substrate from the tool entry side, and FIG. 3H shows the cutting tool extraction side in the fourth synthetic quartz glass substrate from the tool entry side. No microdefects were observed at any of the cutting tool entry sites and extraction sites in the through-holes formed in the synthetic quartz glass substrates.

Comparative Example 1

One synthetic quartz glass substrate and one protective member (cover plate) made of synthetic quartz glass were prepared in the same way as in Example 1.

The synthetic quartz glass substrate and the protective member made of synthetic quartz glass were washed and dried in the same way as in Example 1.

Next, a polished surface of the synthetic quartz glass substrate and a polished surface of the protective member made of synthetic quartz glass were joined using Shiftwax 582W from Nikka Seiko Co., Ltd.

Using a machining center similar to that in Example 1 to cut under the same machining conditions as in Example 1, a hole was formed from the side of the protective member and through the area joined with wax so as to reach the synthetic quartz glass substrate, thus creating a blind hole having a diameter of 0.5 mm and a depth of 0.3 mm in the quartz glass substrate.

Figure 4:
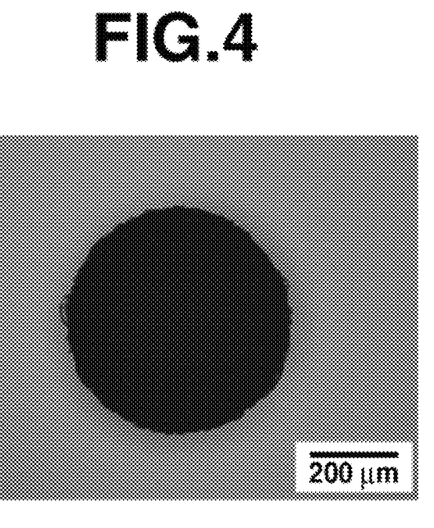
FIG. 4 is a laser micrograph of the cutting tool entry site at the blind hole formed in the synthetic quartz glass substrate in Comparative Example 1.

FIG. 4 is a laser micrograph of the cutting tool entry site for the blind hole formed in the synthetic quartz glass substrate. Numerous chips, the largest having a size of 22 µm, were observed at the cutting tool entry site.

Comparative Example 2

One synthetic quartz glass substrate and two protective members (cover plates) made of synthetic quartz glass were prepared in the same way as in Example 1.

The synthetic quartz glass substrate and the protective members made of synthetic quartz glass were washed and dried in the same way as in Example 1.

Next, one of the polished surfaces of the synthetic quartz glass substrate and a polished surface of the first protective member made of synthetic quartz glass and, separately, the other polished surface of the synthetic quartz glass substrate and a polished surface of the second protective member made of synthetic quartz glass were joined using Shiftwax 582W from Nikka Seiko Co., Ltd.

Using a machining center similar to that in Example 1 to cut under the same machining conditions as in Example 1, a hole was formed from the side of one protective member and through the area joined with wax so as to reach the other protective member, thus creating a through-hole having a diameter of 0.5 mm in the quartz glass substrate.

Figure 5A:
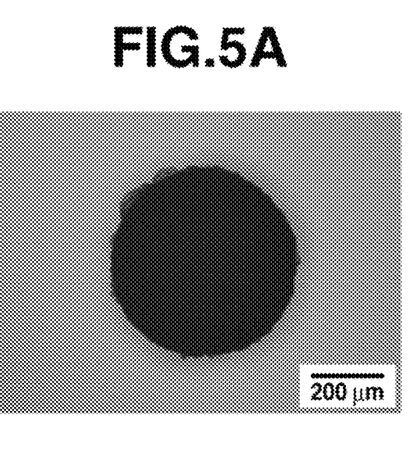
FIG. 5A and FIG. 5B present laser micrographs of the through-hole formed in the synthetic quartz glass substrate in Comparative Example 2, FIG. 5A showing the cutting tool entry site and FIG. 5B showing the cutting tool extraction site.
Figure 5B:
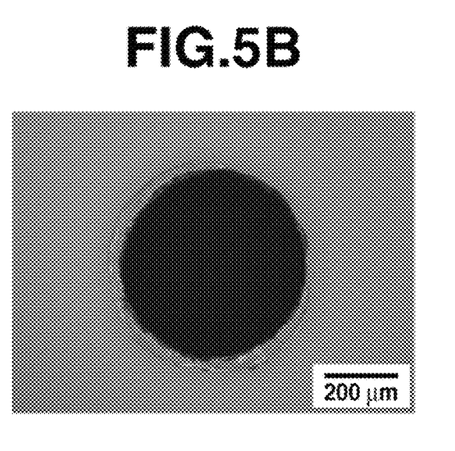

FIG. 5 presents laser micrographs of the through-hole formed in the synthetic quartz glass substrate, FIG. 5A showing the cutting tool entry site and FIG. 5B showing the cutting tool extraction site. Numerous chips, the largest having a size of 31 µm, were observed at the cutting tool entry site. In addition, at the cutting tool extraction site, cracks having a width of up to 46 µm were observed over a broad region around the opening.

It is apparent from the above results that the machining method of the invention is able to effectively prevent the generation of microdefects.

Japanese Patent Application No. 2020-179551 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for machining a synthetic quartz glass substrate, comprising the steps of:
furnishing a synthetic quartz glass substrate as a workpiece;
furnishing a protective member for protecting the workpiece, the protective member made of synthetic quartz glass;
optical contact bonding the workpiece and the protective member by bringing a surface of the protective member into contact with and superposing a surface of the protective member on a surface of the workpiece, so that an optical contact bonding surface is formed between the workpiece and the protective member; and cutting the synthetic quartz glass substrate by passing a cutting tool i) from a protective member side and through the optical contact bonding surface to a synthetic quartz glass substrate side, thereby forming a through-hole or a slit in the protective member, or ii) both from the protective member side and through the optical contact bonding surface to the synthetic quartz glass substrate side, thereby forming a through-hole or a slit in the protective member, and also from the synthetic quartz glass substrate side and through the optical contact bonding surface to the protective member side.

2. The machining method of claim 1, wherein the surface of the synthetic quartz glass substrate and the surface of the protective member, which form the optical contact bonding surface together, each have an arithmetic mean roughness (Ra) of 1 nm or less.

3. The machining method of claim 1, wherein in the cutting step, a blind hole, a channel or a step is formed in the synthetic quartz glass substrate.

4. The machining method of claim 1, wherein in the cutting step, a through-hole or a slit is formed in the synthetic quartz glass substrate.

5. The machining method of claim 1, wherein the protective member has a thickness of at least 0.2 mm.

6. A method for machining synthetic quartz glass substrates, comprising the steps of:

furnishing a plurality of synthetic quartz glass substrates;

optical contact bonding the plurality of synthetic quartz glass substrates by mutually contacting and superposing surfaces of the respective synthetic quartz glass substrates to give a workpiece, so that an optical contact bonding surface is formed between the synthetic quartz glass substrates;

furnishing a first protective member and a second protective member for protecting the workpiece, each of the first and second protective members made of synthetic quartz glass;

optical contact bonding the workpiece and the first and second protective members by i) bringing a surface of the first protective member into contact with and superposing the surface of the first protective member on a surface of the workpiece, and ii) by bringing a surface of the second protective member into contact with and superposing the surface of the second protective member on another surface of the workpiece, so that the workpiece is sandwiched between the first and second protective members and optical contact bonding surfaces are formed between the workpiece and the first and second protective members; and cutting the synthetic quartz glass substrates by passing a cutting tool i) from a first protective member side and through the optical contact bonding surfaces thereof to a workpiece side at the synthetic quartz glass substrate spaced furthest from the first protective member, thereby forming a through-hole or a slit in the first protective member, or ii) from a second protective member side and through the optical contact bonding surfaces thereof to a workpiece side at the synthetic quartz glass substrate spaced furthest from the second protective member thereby forming a through-hole or a slit in the second protective member.

7. The machining method of claim 6, wherein the surfaces of the synthetic quartz glass substrates, which contact with each other, in the workpiece, the surfaces of the workpiece contacting with the first and second protective members, and the surfaces of the first and second protective members contacting with the workpiece, each have an arithmetic mean roughness (Ra) of 1 nm or less.

8. The machining method of claim 6, wherein in the cutting step, a through-hole or a slit is formed in each of the synthetic quartz glass substrates.

9. The machining method of claim 8, wherein in the cutting step, a through-hole or a slit is formed in each of the first and second protective members and the synthetic quartz glass substrates.

10. The machining method of claim 6, wherein each of the protective members has a thickness of at least 0.2 mm.

11. A method for machining a synthetic quartz glass substrate, comprising the steps of:

furnishing a synthetic quartz glass substrate as a workpiece;

furnishing a protective member for protecting the workpiece, the protective member made of synthetic quartz glass;

optical contact bonding the workpiece and the protective member by bringing a surface of the protective member into contact with and superposing a surface of the protective member on a surface of the workpiece, so that an optical contact bonding surface is formed between the workpiece and the protective member; and cutting the synthetic quartz glass substrate by passing a cutting tool from the synthetic quartz glass substrate side and through the optical contact bonding surface to the protective member side to form a through-hole or a slit in the protective member and the synthetic quartz glass substrate.

12. The machining method of claim 11, wherein the surface of the synthetic quartz glass substrate and the surface of the protective member, which form the optical contact bonding surface together, each have an arithmetic mean roughness (Ra) of 1 nm or less.

* * * * *